March 8, 1927. 1,620,425
A. F. BATCHELDER
LOCOMOTIVE OR CAR TRUCK
Filed Oct. 12, 1925
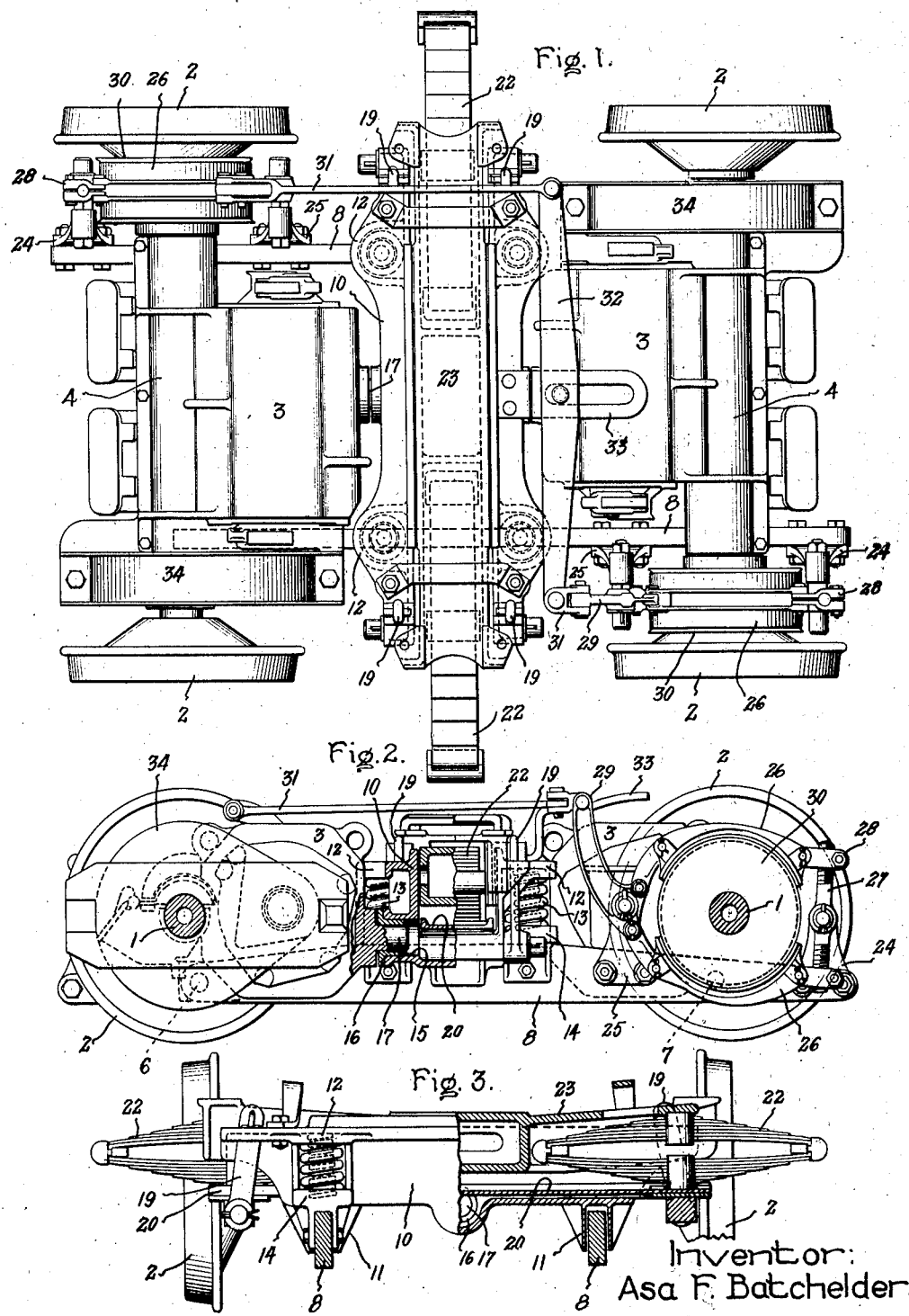
Inventor:
Asa F. Batchelder,
by
His Attorney.

Patented Mar. 8, 1927.

1,620,425

UNITED STATES PATENT OFFICE.

ASA F. BATCHELDER, OF SCOTIA, NEW YORK, ASSIGNOR TO GENERAL ELECTRIC COMPANY, A CORPORATION OF NEW YORK.

LOCOMOTIVE OR CAR TRUCK.

Application filed October 12, 1925. Serial No. 61,904.

My invention relates to locomotive or car trucks and particularly to those which are electrically driven. An object of my invention is the provision of an improved electrically driven truck which is of relatively light construction and which is inexpensive to manufacture.

My invention will be better understood from the following description taken in connection with the accompanying drawing, and its scope will be pointed out in the appended claims.

Referring to the drawing, Fig. 1 is a plan view of a truck embodying my invention; Fig. 2 is a side view of the same with parts removed and parts in section; and Fig. 3 is an end view with the right hand half in section on a central transverse plane.

In the drawing the two axles 1 each have two wheels 2 mounted on their ends. An electric motor 3 is associated with each axle and comprises an elongated bearing 4 in which the adjacent axle is journalled. In this respect this construction is similar to that shown in my Patent Number 1.277,360 of September 3, 1918, assigned to the same assignee as the present application, in that the axle bearings of the motors are utilized as the main bearings of the truck. Pivotally connected to the motors 3 at points 6 and 7, see Fig. 2, are the two equalizer bars 8. The points of connection of these bars with the motors, it will be noted, are located at a considerable distance below the axles. Extending parallel with and midway between the axles is the transom 10 which is channel-shaped and arranged with the open side uppermost. Near each end, the transom has downwardly extending guides 11 which receive one of the equalizer bars 8. For supporting the transom from the equalizer bars the transom is provided at each end with outwardly extending spring sockets 12 which receive the upper ends of coil spring 13. The lower ends of these springs rest in spring socket 14 secured to the equalizer bars. In the side walls of the transom and at a point intermediate its ends are two openings 15 which receive bearing sleeves 16 for trunnions 17 which are formed on the motors 3. These trunnions are arranged on the sides of the motors opposite to the main bearings 4 and are also arranged below the center line of the axles.

A pair of links 19 hangs from each end of the transom to the lower ends of which is pivoted the spring plank 20. Resting on the spring plank at opposite ends thereof are the elliptic springs 22 by which the swing bolster 23 is resiliently supported. The bolster is of a width to be received within and to be guided by the sides of the channel-shaped transom 10. The car body is adapted to be carried by the bolster through center plates.

Each equalizer bar has at two spaced points adjacent one end thereof brake supporting brackets 24 and 25. Bracket 24 serves to support the outer ends of brake shoes 26 through the threaded rod 27 and split nuts 28. Bracket 25 supports the opposite ends of the brake shoes through the brake lever 29. The two pairs of brake shoes 26 engage suitable brake drums 30, one on each axle and arranged diagonally opposite each other. The two brake levers 29 are connected for simultaneous operation by the clevises 31 and the lever 32 which latter rides upon a bracket 33 and is operatively connected to the brake operating mechanism, not shown. Each motor 3 is suitably geared to one of the axles, the gearing being arranged at that end of each axle which is opposite to the brake drum. The gearing is enclosed by the gear case 34.

While I have described only one embodiment of my invention, I do not wish to be limited to the particular form shown and described as it will be apparent that many modifications therein may be made without departing from the scope of my invention as set forth in the appended claims.

What I claim as new and desire to secure by Letters Patent of the United States is:—

1. A locomotive or car truck comprising wheels, an axle connecting the wheels, an electric motor supported at one side on the axle, bars pivotally attached to the motor at points below the axles, and means for supporting the motor at the other side on said bars connected to the motor at a point below the center-line of the axle.

2. A locomotive or car truck comprising wheels, axles joining the wheels, an electric motor for each axle having at one side a bearing for one of the axles, equalizer bars attached adjacent their ends to the motors at points below the axles, and means comprising trunnions arranged below the center-line of the axles for supporting the motors at their opposite sides.

3. A locomotive or car truck comprising an axle and wheels, a motor for the axle, equalizer bars below the axles and supported at one end from the motor and means for supporting the other ends thereof, a transom having guides for receiving the equalizer bars and having means for supporting the motor at a point below its center, and means for resiliently supporting the transom on the equalizer bars.

4. A locomotive or car truck comprising a plurality of axles and wheels, a motor associated with each axle, equalizer bars below the axles attached adjacent their ends to the motors, a transom above said bars having guides for receiving them, means comprising a trunnion whereby the transom partially supports each motor at a point below its center, and springs supporting the transom on the equalizer bars.

5. In a locomotive or car truck, a transom, a spring plank, links suspending the spring plank from the transom, springs carried by the spring plank, a bolster supported by the springs, said transom comprising guiding means for said bolster, axles on said truck having wheels thereon, and means beneath said axles and inside said wheels for supporting said transom and the load carried by the truck on the axles.

6. In a locomotive or car truck, a channel-shaped transom, a spring plank, links suspending the spring plank from the transom, springs supported by the spring plank, a bolster adapted to carry a body structure supported by the springs, said bolster being arranged in and guided by said transom, axles on said truck having wheels thereon, and means beneath said axles and inside said wheels for supporting said transom on the axles.

7. A locomotive or car truck comprising a pair of axles having wheels thereon, a motor having a bearing on one of said axles, bars extending below said axles and inside said wheels, attached at one end to the motor below the axles, and a transom arranged above and supported by the bars.

8. A locomotive or car truck comprising a pair of axles having wheels thereon, an electric motor associated with each axle and having a bearing thereon, equalizer bars extending below said axles and inside said wheels pivoted adjacent their ends to the motors, spring pockets carried by the equalizer bars, springs resting in the pockets, and a transom resting on the springs and arranged above the equalizer bars.

9. In a locomotive or car truck, a plurality of axles having wheels thereon, a motor associated with each axle and having a bearing thereon, equalizer bars attached to the motors, and brake rigging supported by the equalizer bars.

10. In a locomotive or car truck, a plurality of axles having wheels thereon, a motor associated with each axle and having a bearing thereon, equalizer bars pivoted to the motors, brackets carried by the equalizer bars and brake shoes supported by the brackets.

11. A locomotive or car truck comprising a plurality of axles and wheels, a motor associated with each axle, equalizer bars below the axles attached adjacent their ends to the motors, a transom above said bars having guides therefor, means comprising a trunnion whereby the transom partially supports each motor at a point below its center, springs supporting the transom on the equalizer bars, and brake rigging carried by said equalizer bars.

12. In a locomotive or car truck, a channel-shaped transom, a spring plank, links suspending the spring plank from the transom, springs supported by the spring plank, a bolster adapted to carry a body structure supported by the springs, said bolster being arranged in and guided by said transom, axles on said truck having wheels thereon, means beneath said axles and inside said wheels for supporting said transom on the axles, and brake rigging carried by said supporting means.

13. A locomotive or car truck comprising a pair of axles having wheels thereon, a motor having a bearing on one of said axles, equalizer bars attached at one end to the motor and means for supporting them from the other axle, a transom supported by the equalizer bars and arranged thereabove, and brake rigging carried by said equalizer bars.

14. A locomotive or car truck comprising a pair of axles having wheels thereon, an electric motor associated with each axle and having a bearing thereon, equalizer bars pivoted adjacent their ends to the motors, spring pockets carried by the equalizer bars, springs resting in the pockets, a transom resting on the springs and arranged above the equalizer bars, and brake rigging carried by said equalizer bars.

15. A locomotive or car truck comprising a pair of axles having wheels thereon, an electric motor associated with each axle and having a bearing thereon, equalizer bars extending below said axles and inside said wheels pivoted adjacent their ends to the motors, spring pockets carried by the equalizer bars, springs resting in the pockets, a transom resting on the springs and arranged above the equalizer bars, and brake rigging carried by said equalizer bars.

In witness whereof I have hereunto set my hand this 9th day of October, 1925.

ASA F. BATCHELDER.